Aug. 17, 1965  M. CHEVALIER ETAL  3,201,601
ELECTRICAL CONTROL CIRCUITS FOR SEQUENTIAL
ENERGIZATION AND DEENERGIZATION
OF PROGRAMMED APPARATUS

Filed Sept. 29, 1961  2 Sheets-Sheet 1

Inventors:
Michel Chevalier
Gerard Cottrez
by Robert Henderson
attorney

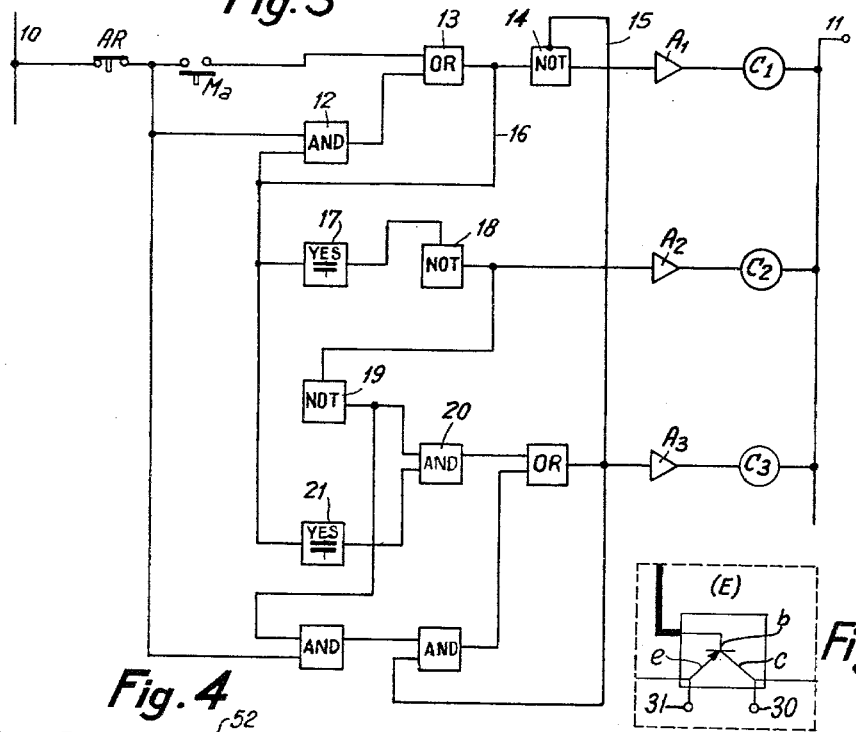
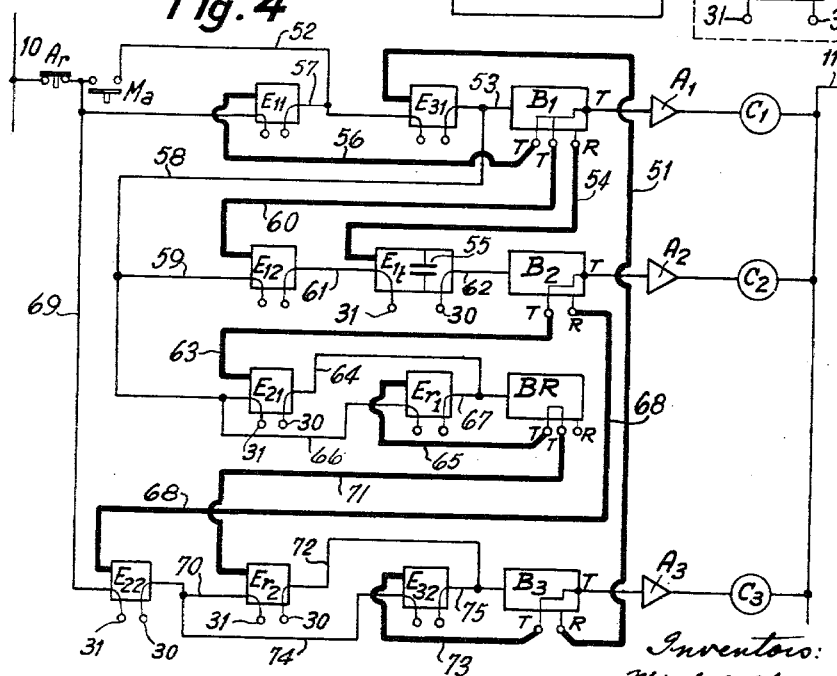

United States Patent Office 3,201,601
Patented Aug. 17, 1965

3,201,601
ELECTRICAL CONTROL CIRCUITS FOR SEQUENTIAL ENERGIZATION AND DEENERGIZATION OF PROGRAMMED APPARATUS
Michel Chevalier and Gerard Cottrez, Rueil, Seine et Oise, France, assignors to La Telemecanique Electrique, Nanterre, Seine, France
Filed Sept. 29, 1961, Ser. No. 141,889
Claims priority, application France, Oct. 12, 1960, 841,803
5 Claims. (Cl. 307—88.5)

For the control of automatic electric equipment, such as machine tools and other industrial apparatuses working according to a preset program, electromagnetic contactors are usually employed, which include electromagnets or solenoids and switches or contacts operated thereby. The solenoids are connected in control circuits which include contacts at least some of which are operated by the solenoids of the contactors themselves and/or by auxiliary relays associated therewith; these control circuits are so designed as to materialize or manifest the desired logical operating conditions of the controlled equipment.

Control systems of the kind just specified, while being very reliable and widely used, have a shortcoming in that they are bulky and include movable mechanical components, and hence are subject to damage by wear, are noisy, and have a relatively long time of response.

It has been known for very many years that an electromechanical relay can be replaced by an electronic valve device, of the triode type, these terms being here used to designate both evacuated tube devices, and solid-state devices. While such electronic valve devices are free from the shortcomings just mentioned, they do not permit, as do electromechanical relays, a complete separation between the control circuit and the controlled circuit. Nevertheless, such electronic valve devices, including the more recently developed magnetic amplifier devices especially those having rectangular characteristics, are currently in wide use being used in the fields of communications, controls and computation.

It has already been proposed, taking advantage of the advanced state of development of such electronic valve devices as used in the fields just mentioned, to construct the logical circuits for controlling automatic electric equipment from such electronic valve devices, these being grouped into functional units which will hereinafter be termed "static relays," each such unit or static relay being defined by a certain logical function. The terminology used herein for designating such logical units or static relays is defined as follows:

A unit delivering an output signal on application of an input signal thereto (and equivalent to an electromechanical relay having one pair of "work" contacts) is called a YES-gate; and a unit delivering an output signal when it does not have an input signal applied thereto is called a NOT-gate sometimes called "negator" (being equivalent to an electromechanical relay having a pair of "rest" contacts).

A unit which delivers an output signal when all of a plurality of inputs have input signals applied thereto (logical multiplication or intersection) is called an AND-gate (and is equivalent to an electromechanical relay having a plurality of work contacts in series).

A unit which delivers an output signal when at least one of a plurality of inputs of said unit has an input signal applied to it (logical addition or union) is called an OR-gate (and is equivalent to an electromechanical relay having a plurality of work contacts in parallel).

A unit which delivers an output signal when none of its plurality of inputs has a signal applied thereto, i.e. the logical complement of an AND-gate will be called a NOR-gate (being equivalent to an electromechanical relay having a plurality of rest contacts in series).

The logical circuits used combine some or all of the above enumerated static relays or gates, with the possible further use of relay elements, storage or memory units, and the like. Such logical circuits as now used have a certain number of drawbacks especially when used in connection with the automatic control of electrical equipment.

First, they are in the form of intricate many-branched networks in which it is difficult to isolate any particular element for checking its operation, service and replacement. Moreover such logical circuits have but little resemblance with conventional electromagnetic circuits and a long time of retraining is necessary for a worker trained in the conventional technique to become familiar with the static-relay logical circuit technique. This apprenticeship is especially difficult because of the abstract character of the logical functions performed by static relays, which are not directly related in an apparent way to the concrete conditions they are supposed to express.

A more serious defect of logical circuits as they have heretofore been constructed is their unreliability. Thus for example considering a static relay of the NOT or the NOR types, it will be clear that a break in the input circuit of the relay due to some accidental cause will produce the same result as a command signal deliberately applied to said relay, and will have repercussions on the entire electrical system to be controlled, rather than merely arresting its operation, as would be required for safety reasons.

In the communications and computer techniques, use is also made of so-called flipflop circuits which are placed in one or another output condition depending on the receipt or non-receipt of one or more input command signals. In this connection the following terminology will here be used. A flipflop circuit so constructed as to shift from one to another of two output conditions on receipt of an input signal, and to return to the initial condition on removal of the command signal (such as a one-shot multivibrator) will be termed a monostable flipflop. A flipflop circuit such that it shifts from one to another condition on receipt of an input signal and remains in said other condition so long as it has not received another input signal, whereupon it is restored to said one condition, will be termed a bistable flipflop.

Various circuits have been suggested for the construction of flipflops. One particularly simple form of monostable flipflop circuit includes a pair of asymmetrically coupled triodes (which may be tubes or transistors or other solid-state elements).

It has already been observed (cf. for example German Patent 1,054,492) that when an output of such a monostable flipflop is used as a biassing voltage for rendering conductive or non-conductive an electronic valve element, the flipflop is comparable to an electromechanical relay including the relay winding, magnetic core and movable armature of said relay, while the electronic valve element is comparable to a pair of contacts of such relay. In the afore-mentioned German patent, such a circuit is used as an intermediate relay means interposed between an input signal line and an electromechanical relay, with an output transistor element being rendered conductive by the output signal from the flipflop, serving to complete a circuit for energizing the winding of the electromechanical relay.

It is an object of this invention to provide a control system and control circuits for programmed industrial electrical apparatus, which is free from the above mentioned disadvantages inherent in conventional logical circuitry while having all the advantages thereof. The invention is based on an especially advantageous use of the remarks made in the foregoing paragraph.

The control system of the invention has the further advantage that it is representable by circuit diagrams similar to those involving conventional electromechanical relays and hence is immediately comprehensible to personnel familiar with such conventional techniques.

In a circuit comprising at least one monostable flipflop and at least one electronic output element in which current flow is controlled by an output voltage from said flipflop, according to the invention, each flipflop has two separate output terminals only a first one of which is energized on application of an input voltage to the input of the flipflop, while the other is energized in the absence of an input voltage applied to the flipflop input. The input signal for the flipflop is derived from the output of a chain of AND-gates each having two inputs and an output, one input of each AND-gate being connected with an output of a flipflop and the other being connected with the output of another AND-gate of the chain, except as regards at least one relay at the initial end of the chain, which relay has a command voltage directly applied thereto.

In such a circuit arrangement, each flipflop connected at the output of a chain is adapted to have one of its output terminals connected (directly or through an amplifier) for energizing a contactor device serving effectively to start in operation a part of the automatic equipment to be controlled, such operation however being made subordinate to the application of a control signal to the origin of at least one chain of the circuit; the connections of the static AND-gates in the chain or chains of the circuit determine which of said flipflops are actuated and the operating sequence in which they operate.

The flipflops are preferably provided in the form of a pair of asymmetrically coupled transistors so as to react mutually with one another in a manner known per se.

Preferably moreover and AND-gates used are provided in the form of transistors, wherein the emitter and base constitute the two inputs of the gate and the collector the output. In such case, the input terminal connected with an output terminal of a flipflop of the circuit is, preferably, the base of the transistor.

The similarity of a control circuit according to the invention with conventional electromechanical circuits will be made clear hereinafter in the case of a schematically shown example.

In contrast with what is known from the afore-mentioned German patent, the flipflops and AND-gates are provided as separate elements, whereas in said patent the flipflop and the "contact" transistor associated therewith formed a unit. Moreover the AND-gates constituting the chains control the inputs of each flipflop whereas in the German patent the "contact" transistor formed the output stage of the flipflop.

The ensuing description made with reference to the accompanying drawing, given by way of illustration but not of limitation, will provide a clear understanding of the manner in which the invention may be worked.

FIG. 3 shows a control circuit for the apparatus of FIG. 1 employing conventional logical circuits;

FIG. 4 shows a control circuit for said apparatus according to the invention; and FIG. 4a illustrates the pertinent circuitry of an AND-gate of the type employed in the circuit of FIG. 4.

Figure 1:
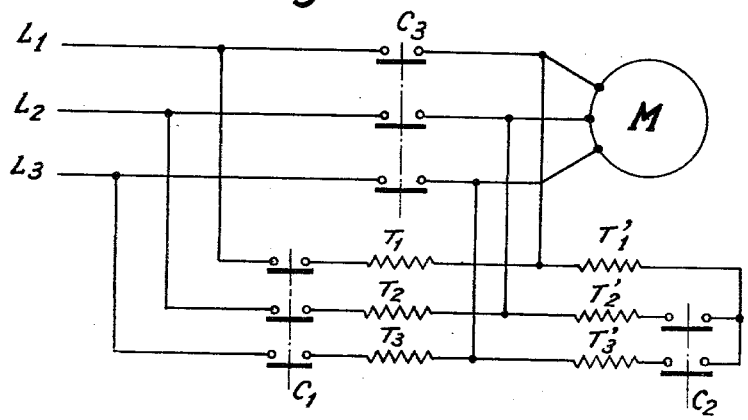
FIG. 1 is a diagram illustrating one example of electrical equipment to be automatically controlled.

The electrical apparatus shown in FIG. 1 comprises an asynchronous motor M supplied from a three-phase power line $L_1$, $L_2$, $L_3$. A starting circuit is provided for achieving proper starting of the motor without excessive load current peaks. The starting circuit comprises an auto-transformer consisting of three windings $T_1-T_{1'}$, $T_2-T_{2'}$, $T_3-T_{3'}$ adapted to be connected in a Y-circuit for starting under reduced voltage, the switching being effected by means of the three pairs of contacts $c_1$, $c_2$, $c_3$. For starting the motor M, the contacts $c_1$ are closed for supplying the auto-transformer from the power lines $L_1$, $L_2$, $L_3$. At the same time, the contacts $c_2$ complete the Y-circuit connections of the three auto-transformer windings. The motor is thus started under reduced voltage. After a few seconds time, when the speed of the motor has increased to a sufficiently high value, the contacts $c_1$ and $c_2$ are opened again and the contacts $c_3$ are then closed to provide a direct supply to motor M from the lines. It will be understood that the auto-transformer should be completely disconnected in normal operation since it is not designed for prolonged operation under a high voltage supply.

Figure 2:
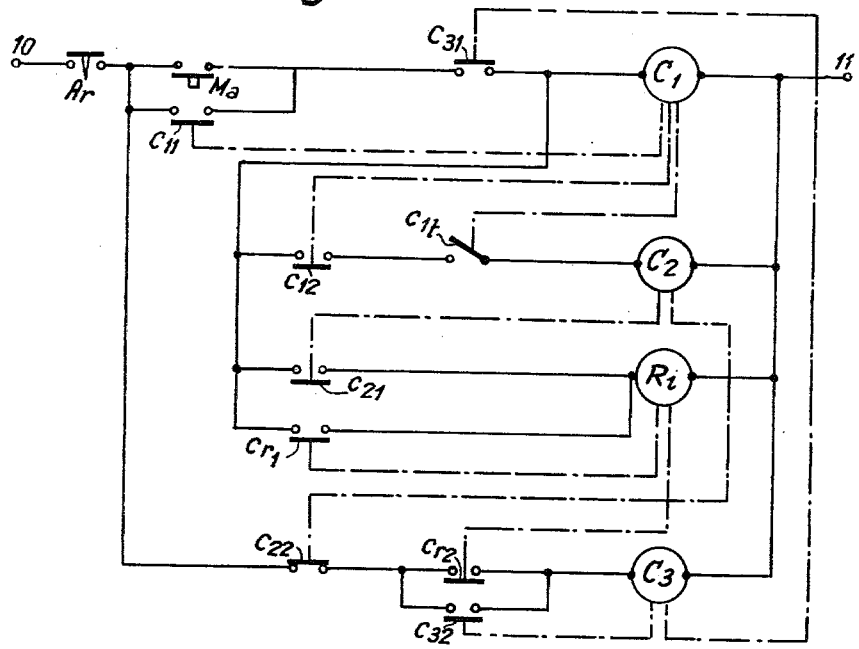
FIG. 2 shows a conventional control circuit for controlling the equipment of FIG. 1 using contactor and electromechanical relays.

In a conventional manner, the operating sequence for the switch contacts $c_1$, $c_2$, $c_3$ is provided by means of the circuit diagram illustrated in FIG. 2, which shows the three contactors or relays $C_1$, $C_2$, $C_3$ which respectively operate the switch contacts $c_1$, $c_2$, $c_3$, and moreover an intermediate relay R$i$. The contactors and the relay are all connected in parallel across the terminals 10 and 11 of a voltage source, a manual cutoff switch A$r$ being provided for controlling the application of line voltage.

The energization of contactor $C_1$ depends on the closure of an operating switch M$a$ which is shunted by a normally open contact $c_{11}$ of the contactor. The contactors $C_1$, $C_2$ and relay R$i$ are to be deenergized when the relay $C_3$ is energized; hence their energizing circuit includes the rest, i.e. normally closed, contact, $c_{31}$, of relay $C_3$. The energization of contactor relay $C_2$ is furthermore dependent on the closure of (normally open) work contacts $c_{12}$ of contactor relay $C_1$, and on the closure of rest (normally closed) contacts $c_{1t}$ of contactor $C_1$, which latter contacts are provided with means for delaying the opening movement thereof.

Relay R$i$ is energized by way of work (normally open) contacts $c_{21}$ of contactor relay $C_2$, and is provided with holding contacts $c_{r1}$.

Contactor relay $C_3$ is directly energized by way of pushbutton switch A$r$, through the pair of work contacts $c_{r2}$ which is shunted by parallel work contacts $c_{32}$ controlled from contactor relay $C_3$ the flow of current through this circuit being dependent on closure of rest contacts $c_{22}$ of contactor relay $C_2$.

It can readily be appreciated that the circuit shown in FIG. 2 provides for the desired sequence of operations in connection with the starting of motor M. When the operating switch M$a$ is closed, the contactor $C_1$ is first energized, then the contactor $C_2$ and relay R$i$ are energized in sequence, whereupon a low-speed starting circuit is completed for the motor M. The delayed-opening contacts $c_{1t}$ controlled by $C_1$ open after a certain delay time, thereby cutting off the energizing circuit for contactor $C_2$, so that the rest contacts $c_{22}$ close, and relay $C_3$ is energized, is held by its holding contact $c_{32}$, and opens contacts $c_{31}$ thereby deenergizing $C_1$, $C_2$ and R$i$.

When cutoff switch A$r$ is opened, contactor $C_3$ is deenergized, the motor is stopped and the circuit is restored to its idle condition.

FIG. 3 illustrates a control circuit for controlling the three contactor relays $C_1$, $C_2$, $C_3$, using logical elements in the form of static relays. As in FIG. 2 the power terminals are shown at 10 and 11, and the three contactors $C_1$, $C_2$, $C_3$ are connected in parallel across these terminals through respective control circuit branches including the amplifiers, $A_1$, $A_2$, $A_3$ respectively, whose outputs feed the respective contactors. For greater clarity, the auxiliary voltages for supplying the static relays have not been shown.

Two logical relays 12 and 13, respectively an AND-gate and an OR-gate, are associated as shown with a NOT-gate 14.

The amplifier $A_1$ feeding the contactor $C_1$ is supplied from the output of a NOT-gate 14 which in turn has its input connected to the output of an OR-gate 13 one input of which is connected with the terminal 10 through cutoff switch AR and manual operating switch M$a$, and the other input of which is connected to the output of AND-gate 12 having an input connected with source terminal 10 through cutoff switch AR and its other input connected with the output of OR-gate 13 as shown. On closure of operating switch M$a$, a voltage signal is applied to one input of OR-gate 13 which thereupon applies an output signal to NOT-gate 14. In the absence of a voltage applied by way of line 15 to the NOT-gate 14, the latter applies a voltage through amplifier $A_1$ to contactor $C_1$.

The output from OR-gate 13 is applied through line 16 to the input of AND-gate 12. As gate 13 becomes conductive, the AND-gate 12 has both of its inputs energized and hence applies a signal to gate 13 which, by way of NOT-gate 14, applies a holding voltage which maintains energization of contactor $C_1$.

The circuit shown in FIG. 3 need not be described in detail since its operation will be evident to those familiar with the art from the diagram shown, it being simply necessary to state that the gates 17 and 21 are time-delayed YES-gates, the delay imparted by 21 being somewhat longer than that imparted by 17, so that the voltage applied to $C_2$ through NOT-gate 18 is cut off first, and an energizing signal is thereafter applied to $C_3$ when the AND-gate 20 has both its inputs energized from 19 and 21. The operation of the circuit of FIG. 3 will thus be readily understood and it will be seen that such operation is equivalent to that of the conventional circuit of FIG. 2.

Thus, it will be noted that the circuit of FIG. 3 utilizes three NOT-gates 14, 18 and 19. Hence, the absence of an input voltage due to a fault of any type in the circuit, such as a break in a connection, or a faulty contact, will necessarily be interpreted as a command signal and will cause a defective operation of the whole system.

It will further be noted that a number of the circuits shown in FIG. 3 are looped, so that a mesh-type network is provided which is difficult to test in order to ascertain which particular component is defective in case of defective operation of the circuit as a whole. Moreover, a comparison between the diagrams of FIGS. 2 and 3 makes it evident that the two diagrams differ considerably from each other so that familiarity with the former circuit is insufficient to permit of readily constructing and servicing the latter.

The circuit of the invention shown in FIG. 4, by way of distinction from the circuit shown in FIG. 3, employs only two types of static relays, namely a plurality of two-input AND-gates, and a plurality of monostable flipflops, preferably of the type consisting of transistors and including a control signal input and two outputs which may be provided e.g. by the collectors of the two transistors, and on which alternately occur the output voltages according as an input voltage signal is, or is not, applied. For greater clarity, the particular output that is energized when a control signal is applied is called the work output T, and the other output which is energized when no control signal is applied is called the rest output R. It is emphasized that each flipflop has only *two* outputs T and R, despite the fact that in FIG. 4 several points labeled "T" are shown at each flipflop. It is only for the sake of clarity that each wire or cable is shown as connected to its own associated terminal. Actually, all of the terminals T in each of the flipflops $B_1$, $B_2$, $B_3$ and BR are connected to one another, and all the respective wires could just as well be shown as meeting at a single point.

The circuit as a whole, as in the previously shown arrangements, is connected across the source terminals 10 and 11, with the contactors $C_1$, $C_2$, $C_3$ being connected in parallel and supplied from the amplifiers $A_1$, $A_2$, $A_3$.

Amplifier $A_1$ is supplied with the output T of flipflop $B_1$ controlled by two AND-gates $E_{11}$ and $E_{31}$. Flipflop $B_2$ is similarly controlled by the two AND-gates $E_{12}$ and $E_{1T}$, the latter being delayed. An auxiliary flipflop BR is used for registering energization of the T output of $B_2$ and controlling the third flipflop $B_3$. Flipflop BR is controlled by the two AND-gates $E_{21}$ and $E_{r1}$, and flipflop $B_3$ by the three AND-gates $E_{22}$, $E_{r2}$ and $E_{32}$.

As will be realised from a consideration of the diagram, each of the AND-gates has one of its two inputs connected to an output T or R of a respective one of the flipflops $B_1$, $B_2$, $B_3$ or BR, and, except for AND-gate $E_{11}$, each AND-gate has its other input connected to an output of another AND-gate. In other words, each AND-gate behaves as a conventional electric switch inserted between the second input and the output of the gate, which switch is controlled to one or the other of its states by the flipflop with which is connected the first input of the AND-gate.

According as said first input is connected to a T output or an R output of the associated flipflop, the AND-gate will behave as a pair of work contacts or rest contacts. Each flipflop is comparable, as explained in the beginning of the specification, to the assembly comprising a winding, core and armature of an electromechanical relay, and can thus control a plurality of work contacts and rest contacts which, in their turn, control the state of the flipflop concerned as well as other flipflops of the circuit.

The operation of the circuit shown in FIG. 4 is as follows:

At the start, it is noted that one input of AND-gate $E_{31}$ is receiving a voltage from the rest output R of flipflop $B_3$ (the input of which is at that time without voltage) via connection 51. When the push button M$a$ is now depressed, the second input of AND-gate $E_{31}$ receives the control voltage from line 10 via connection 52. The resultant output voltage of the said gate is applied via connection 53 to the input of flipflops $B_1$ which is thereby shifted out of its rest state and provides an output voltage at the terminals of its own work output T. Contactor $C_1$ is, consequently, energized through amplifier $A_1$.

Since the voltage at the work output T of flipflops $B_1$ is also applied via connection 56 to AND-gate $E_{11}$, both inputs of the latter are under voltage, whereby the output of this gate supplies a voltage via connections 57 and 52 to that input of AND-gate $E_{31}$ which is connected to the push button M$a$. This creates a holding circuit for flipflop $B_1$ which thus remains in shifted condition, with a voltage appearing at its work output T, even when the push button M$a$ is released.

Two voltages are now applied to the respective inputs of AND-gate $E_{12}$, i.e. the output voltage of $E_{31}$ via connection 58–59, and the voltage at the work output T of flipflop $B_1$ via connection 60. The resultant output voltage of $E_{12}$ is applied via connection 61 to one input of AND-gate $E_{1t}$, the second input receiving, via connection 54, the voltage of the rest output of flipflop $B_1$. AND-gate $E_{1t}$ being delayed, as shown by capacitor 55, an output voltage is applied via connection 62 to the input of flipflop $B_2$ and this continues during the delay of the AND-gate. Thus flipflop $B_2$ is shifted and its work output T yields a voltage for energizing contactor $C_2$ through amplifier $A_2$ for the duration of the capacitor discharge.

Due to these operational stages, two voltages are now applied to the respective inputs of AND-gate $E_{21}$, i.e. the output of AND-gate $E_{31}$ via connection 58, and the voltage at the work output T of flipflop $B_2$ via connection 63. The resultant output voltage of $E_{21}$ is applied via connection 64 to flipflop BR, shifting the same to provide a voltage at its own work output T. This voltage is applied via connection 65 to AND-gate $E_{r1}$ which also receives the output voltage of $E_{31}$ via connections 58 and 66. The output voltage of $E_{r1}$ is applied via connection 67 to the input of flipflop BR which thus remains shifted under the holding action of $E_{r1}$ as long as AND-gate $E_{31}$ supplies a voltage at its own output.

When the period of time during which the delayed AND-gate $E_{1t}$ delivers an output voltage has passed, flipflop $B_2$ automatically returns to its original state, whereby contactor $C_2$ is deenergized and a voltage is provided at rest output R of $B_2$. This voltage is applied via connection 68 to one input of AND-gate $E_{22}$, to the other input of which a voltage is applied from line 10 via connection 69. This provides an output voltage which is applied via connection 70 to AND-gate $E_{r2}$. Since the latter is already receiving the voltage from the work output T of flipflop BR via connection 71, AND-gate $E_{r2}$ provides an output voltage which is applied via connection 72 to flipflop $B_3$ to shift the same and energize contactor $C_3$ through amplifier $A_3$. At the same time, the voltage at the work output T of flipflop $B_3$ is applied via connection 73 to one input of AND-gate $E_{32}$ the other input of which was already receiving the output voltage of AND-gate $E_{22}$ via connection 74. This establishes a holding circuit via AND-gate $E_{32}$ and connection 75 for flipflop $B_3$, and contactor $C_3$ thus remains energized as long as AND-gate $E_{22}$ supplies an output voltage, i.e. as long as flipflop $B_2$ remains in its rest state and switch AR closed.

Flipflop $B_3$ having been shifted, AND-gate $E_{31}$ is now deprived of one input voltage, i.e. the one previously applied thereto via connection 51 from rest output R of $B_3$, and ceases to provide an output voltage, whereby flipflop $B_1$ is returned to its rest state. As a concomitant thereof, AND-gates $E_{11}$ and $E_{21}$ are deprived of an input voltage each. With AND-gates $E_{31}$ and $E_{21}$ turned "off," flipflop BR is returned to its rest state. $C_3$, of course continues in operation until switch AR is opened.

It is seen, therefore, that the circuit of FIG. 4 gives the same sequential operation as the arrangement of FIG. 2, i.e. the closing of $C_1$ and $C_2$, the latter without any delay, the opening of $C_2$ after a given period of time, and the subsequent closing of $C_3$ followed by the reopening of $C_1$.

Comparing the diagrams of FIGS. 2 and 4, it is seen that each of the pairs of contacts in FIG. 2 is exactly equivalent to an AND-gate of FIG. 4 so that, in practice, the diagrams are equivalent. The broken line connections which, in FIG. 2, represent mechanical connections from contactors to the contacts controlled thereby are here replaced, in FIG. 4, by electrical connections, shown in thick lines, from a flipflop output R or T to the corresponding AND-gate. Such electrical connections are, of course, much more flexible and convenient to establish than are mechanical connections, so that greater freedom is available for the construction of the circuits. Thus, it becomes possible to reproduce substantially the operating diagrams of the electromechanical circuits, while respecting the relative positions of the components shown in such diagrams.

As previously stated, each of the AND-gates employed in the circuit of FIG. 4 and generally designated by reference character E in FIG. 4a, is advantageously a transistor having a base $b$, an emitter $e$ and a collector $c$. The bases $b$ constitute those inputs of the respective transistors to which the electrical connections shown in thick lines are connected, while the emitters $e$ constitute those inputs of the respective transistors to which are connected the electrical connections shown in fine lines at the left-hand sides of the AND-gates in FIG. 4. The collectors $c$ constitute the outputs of the respective transistors to which are connected the electrical connections shown in fine lines at the right-hand sides of the AND-gates in FIG. 4. In this arrangement, a chain of AND-gates comprises the emitter-collector circuits of the transistors serially connected and terminating at the input of an associated flipflop.

Moreover, the testing, maintenance and replacement of the components of such a circuit are practically as easily performed as in the case with a conventional electromechanical circuit. For this purpose, according to the invention, each AND-gate is provided with two projecting test terminals. One test terminal 30 of the gate is an output terminal and the other test terminal 31 corresponds to that one of the two inputs of the gate which is connected with the output of another AND-gate, or directly with a control input signal, in other words that input which is not connected with a flipflop output T or R.

In a circuit according to the invention, each AND-gate behaves as a pair of switch contacts which makes or breaks a circuit between an input and an output each provided with a test terminal. Hence, for testing the circuit, the same procedure may be used as is used with ordinary electromechanical switch contacts, i.e. by shunting the test terminals to check the continuity of the corresponding circuit and/or measuring with a voltmeter the voltage across the test terminals. Since the AND-gates and the contacts of the electromechanical circuit correspond with one another, the same test programs may be used in either case.

Preferably, as shown in FIG. 4, all the AND-gates forming the chain controlling the state of a flipflop, are aligned with said flipflop. This is equivalent to positioning, in the circuit of FIG. 2, all the component elements of the circuit on the full-line connection leading to a contactor or a relay.

Alternatively, the AND-gates connected to the output terminal of a common flipflop may all be aligned together. Such an arrangement will correspond to the usual electromechanical constructions in which all the contacts associated with a common contactor or relay are substantially positioned in a common area.

Beyond the flipflop there will therefore be positioned the connections from the output T of the flipflop to the utilization device receiving the voltage output from the flipflop; while at the input to the chain there may be placed the mechanical contacts, such as manual or cyclically operated switches, limit switches, pressure-, temperature-, and/or, -level-responsive switches, and the like, which are to control the operation of the apparatus.

Preferably, the conductors corresponding to a series of aligned elements are grouped together in a common rectilinear conduit which may form a base on which are mounted, e.g. by plugging, the circuit elements in the form of removable units. In such case the units are preferably all of similar dimensions and constructed so as to be juxtaposable with one another, so that the conduits are equal in length to a multiple of the length of a unit.

It will be understood that various modifications may be made in the forms of embodiment just described without departing from the scope of the invention.

What we claim is:

1. An electrical circuit arrangement for controlling the sequential energization and deenergization of a plurality of controlled elements, comprising: a plurality of monostable flipflops each having an input and two outputs and adapted to provide a voltage at a first one of said outputs if a voltage is applied to said input, and to provide a voltage at the second output if no voltage is applied to said input; means connecting said first outputs of some of said flipflops with respective ones of said controlled elements; a plurality of chains of AND-gates each associated with a respective one of said flipflops for controlling shifting thereof; each of said AND-gates having first and second inputs and one output; one single, direct connection between the first input of each AND-gate and a selected one output of one flipflop; means interconnecting the output of at least an end one of the AND-gates of each chain and the input of the associated flipflop; means connecting the outputs of the other AND-gates to said second inputs of some of said AND-gates; means connecting the said second input of the initial AND-gate of each chain to a feed voltage and means for selectively applying a command signal to said second input of an initial AND-gate of at least one of said chains, the pattern of said interconnecting means ensuring that application of said command signal produces the desired sequential energization and deenergization of the controlled elements.

2. An electrical circuit arrangement for controlling the sequential energization and deenergization of a plurality of controlled elements, comprising: a plurality of monostable flipflops each having an input and two outputs and adapted to provide a voltage at a first one of said outputs if a voltage is applied to said input, and to provide a voltage at the second output if no voltage is applied to said input; means connecting said first outputs of some of said flipflops with respective ones of said controlled elements; a plurality of AND-gates each having first and second inputs and one output, each of said first inputs controlling the internal path in its respective AND-gate between said second input and the associated output; a plurality of electrical circuits each connected to a respective flipflop input and comprising at least one of the internal paths of said AND-gates; one single direct connection between the first input of each AND-gate and a selected one output of one flipflop; means for electrically interconnecting portions of said circuits remote from said flipflops; and means for selectively applying a command signal to said second input of an AND-gate located toward the end of at least one circuit remote from the corresponding flipflop.

3. An electrical circuit according to claim 2, further comprising a pair of testing terminals connected with each of said AND-gates for testing the associated internal path, one of said testing terminals for each AND-gate being connected to said second input of that AND-gate, and the other testing terminal for the same AND-gate being connected to the output of the latter.

4. An electrical circuit according to claim 2, wherein at least some of said AND-gates are transistors in each of which said internal path is the emitter-collector path and said first input is the base thereof.

5. An electrical circuit according to claim 1, including means for mounting said AND-gates of each chain in alignment with the associated flipflop.

References Cited by the Examiner

UNITED STATES PATENTS

| | | | |
|---|---|---|---|
| 2,655,598 | 10/53 | Eckert et al. | 328—97 |
| 2,906,869 | 9/59 | Kramskoy | 328—97 |
| 2,977,539 | 3/61 | Townsend | 328—97 |
| 3,049,650 | 8/62 | Greenblatt | 307—88.5 |

OTHER REFERENCES

Brown et al.: "Transistors, a New Class of Relays," Control, pages 70–76.

Arithmetic Operations in Digital Computers, by Richards, D. Van Nostrand Co. Inc., New Jersey, pages 43 and 44, 77–80 and 145.

ARTHUR GAUSS, *Primary Examiner.*

JOHN W. HUCKERT, *Examiner.*